United States Patent
Yamada et al.

(10) Patent No.: US 7,014,265 B2
(45) Date of Patent: Mar. 21, 2006

(54) SEAT DEVICE FOR VEHICLE

(75) Inventors: Yukifumi Yamada, Toyota (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/961,223

(22) Filed: Oct. 12, 2004

(65) Prior Publication Data
US 2005/0082892 A1  Apr. 21, 2005

(30) Foreign Application Priority Data
Oct. 17, 2003 (JP) .............................. 2003-358143
Oct. 6, 2004 (JP) .............................. 2004-293195

(51) Int. Cl.
*B60B 2/20* (2006.01)
(52) U.S. Cl. .................................. 297/367; 297/378.12
(58) Field of Classification Search ............. 297/378.1, 297/378.12, 367
See application file for complete search history.

(56) References Cited

U.S. PATENT DOCUMENTS

| | | | |
|---|---|---|---|
| 4,502,730 A * | 3/1985 | Kazaoka et al. | 297/378.12 |
| 4,660,886 A | 4/1987 | Terada et al. | |
| 5,522,643 A * | 6/1996 | Matsuura | 297/367 |
| 6,007,153 A | 12/1999 | Benoit et al. | |
| 6,161,899 A * | 12/2000 | Yu | 297/378.12 |
| 6,619,744 B1 | 9/2003 | Reubeuze | |
| 6,659,557 B1 * | 12/2003 | Deptolla | 297/367 |
| 2003/0080600 A1 * | 5/2003 | Eppert | 297/367 |

FOREIGN PATENT DOCUMENTS

| | | | |
|---|---|---|---|
| JP | 53023426 A * | 3/1978 | |
| WO | WO 00/69672 A1 | 11/2000 | |

* cited by examiner

*Primary Examiner*—Anthony D. Barfield
(74) *Attorney, Agent, or Firm*—Buchanan Ingersoll PC

(57) ABSTRACT

A seat device for a vehicle comprises a reclining mechanism including a fixed member and a movable member and supporting the movable member rotatably relative to the fixed member, an operation lever moved from an initial position thereof to an operating position thereof, a base member, a latch member, a memory member being engageable with the latch member and rotatably supported by the base member so as to be rotated relative to the base member integrally with the latch member when the memory member is engaged with the latch member, an actuating member coupled to the movable member so as to be rotated in conjunction with the rotation of the movable member relative to the fixed member at the outside of the regular angle range, and an engaging member coupled to the actuating member, held at a disengaged position relative to the operation lever when the movable member is within the regular angle range and moved to an engaging position relative to the operation lever when the movable member is outside of the regular angle range.

9 Claims, 9 Drawing Sheets

SEAT DEVICE FOR VEHICLE

CROSS REFERENCE TO RELATED APPLICATIONS

This application is based on and claims priority under 35 U.S.C. § 119 to Japanese Patent Applications 2003-358143, filed on Oct. 17, 2003 and 2004-293195, filed on Oct. 6, 2004, the entire content of which is incorporated herein by reference.

FIELD OF THE INVENTION

This invention generally relates to a seat device for a vehicle including an angle position memorizing mechanism for restoring a seat back being reclined in a forward position to its original seating position before being reclined in the forward position.

BACKGROUND

A known seat device disclosed in U.S. Pat. No. 6,007,153B2 includes a reclining mechanism, an angle position memorizing mechanism and an operation lever. The reclining mechanism rotatably supports a movable member provided at the seat back side relative to a fixed member provided at the seat cushion side and has a locked state in which the relative rotation of the movable member relative to the fixed member is limited within an predetermined regular angle range so that the movable member is held at an angle position relative to the fixed member and an unlocked state where the movable member is allowed to rotate relative to the fixed member.

The angle position memorizing mechanism connected to the movable member memorizes the angle position of the reclining mechanism being in the locked state. The operation lever connected to the reclining mechanism to be moved from an initial position thereof to an operating position thereof so as to change the state of the reclining mechanism from the locked state to the unlocked state for adjusting the angle of the seat back.

The angle position memorizing mechanism provided integrally with the reclining mechanism includes another operation lever for reclining the seat back in the forward position, and such operation lever is different from the aforementioned operation lever for changing the state of the reclining mechanism from the locked state to the unlocked state. Further, the angle position memorizing mechanism is activated by such operation lever used for reclining the seat back in the forward position so as to restore the seat back being reclined in the forward position (outside of the regular angle range) to its original position (within the regular angle range) before being reclined in the forward position.

According to the known seat device, the seat back is reclined in the forward position not using the operation lever for adjusting the angle of the reclining mechanism but using the operation lever for reclining the seat back in the forward position. Therefore, a user of the seat must conduct a complicated operation.

Thus, a need exists for the seat device to include a single operation lever which is used to recline the seat back in the forward position and adjust the angle of the seat back. Further, the seat back is returned to seating position which is before the seat back is recline

SUMMARY OF THE INVENTION

According to an aspect of the present invention, a seat device includes a reclining mechanism including a fixed member adapted to be mounted on a seat cushion and a movable member adapted to be mounted on a seat back, supporting the movable member rotatably relative to the fixed member and having a locked state in which the movable member is held at an angle position relative to the fixed member by limiting a rotation of the movable member relative to the fixed member within a predetermined regular angle range and an unlocked state in which the movable member is allowed to be rotated relative to the fixed member, an operation lever connected to the reclining mechanism to be moved from an initial position thereof to an operating position thereof for changing a state of the reclining mechanism from the locked state to the unlocked state, a base member attached at either one of the fixed member or the movable member, a latch member attached at the other one of the fixed member or the movable member, a memory member being engageable with the latch member and rotatably supported by the base member so as to be rotated relative to the base member integrally with the latch member when the memory member is engaged with the latch member, an actuating member coupled to the movable member so as to be rotated in conjunction with the rotation of the movable member relative to the fixed member at the outside of the regular angle range, and an engaging member coupled to the actuating member, held at a disengaged position relative to the operation lever when the movable member is within the regular angle range and moved to an engaging position relative to the operation lever when the movable member is outside of the regular angle range so as to prevent the operation lever from returning from the initial position to the operating position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
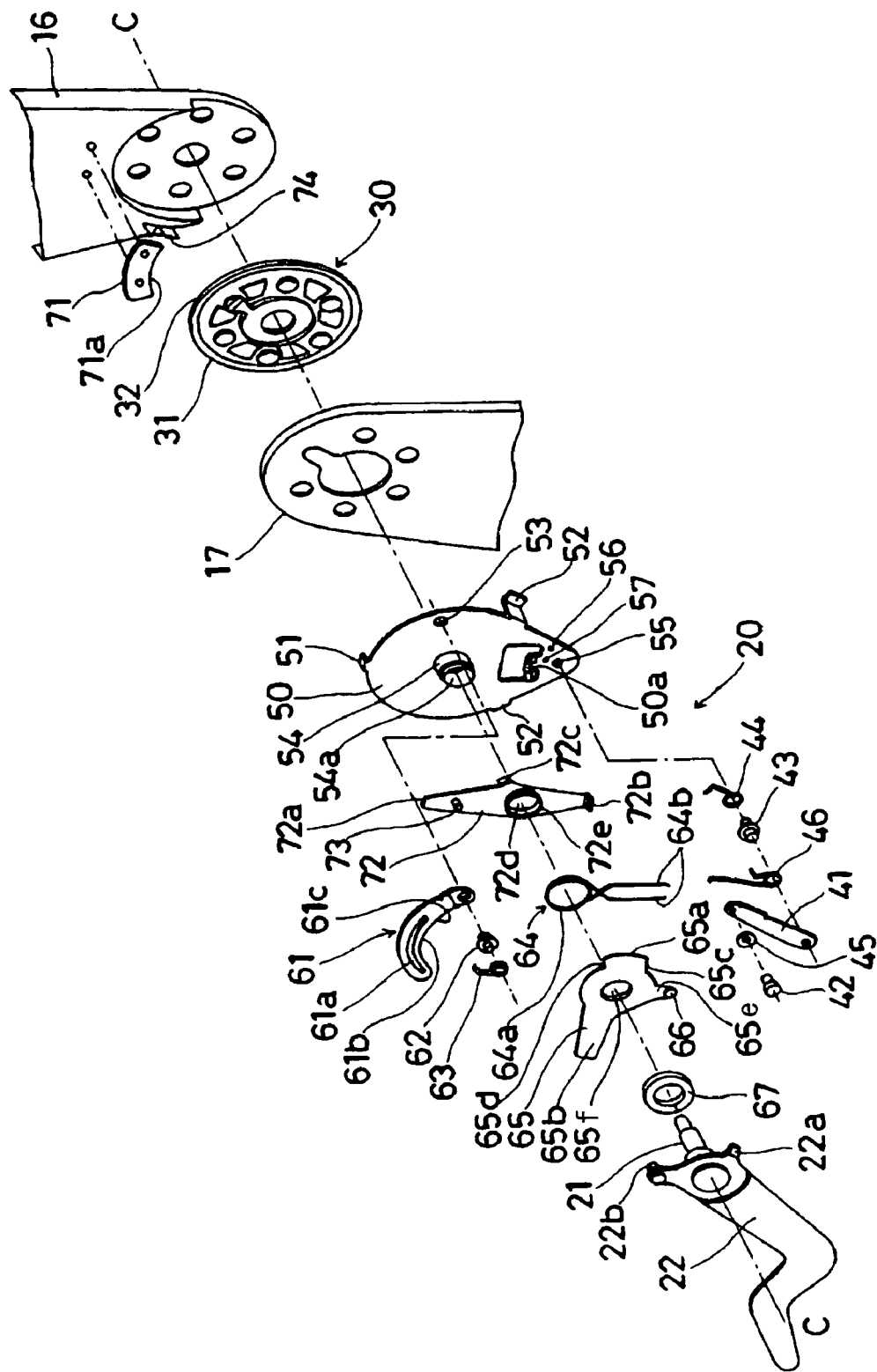
FIG. 1 illustrates a exploded perspective view of an angle position memorizing mechanism of a vehicle seat device according to the present invention.
Figure 2:
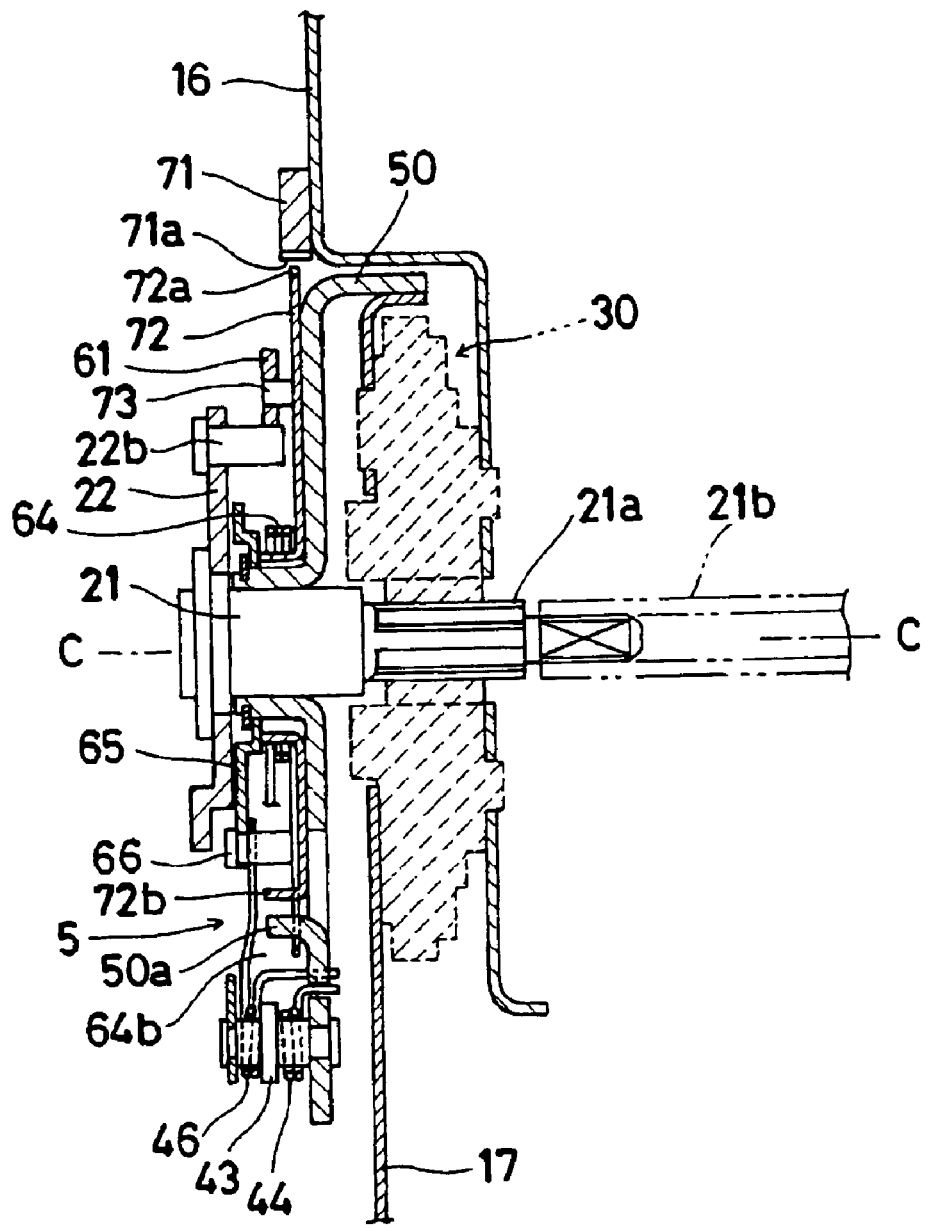
FIG. 2 illustrates a cross sectional view of the angle position memorizing mechanism of the vehicle seat device relative along the center of the angle position memorizing mechanism according to the present invention.
Figure 8:
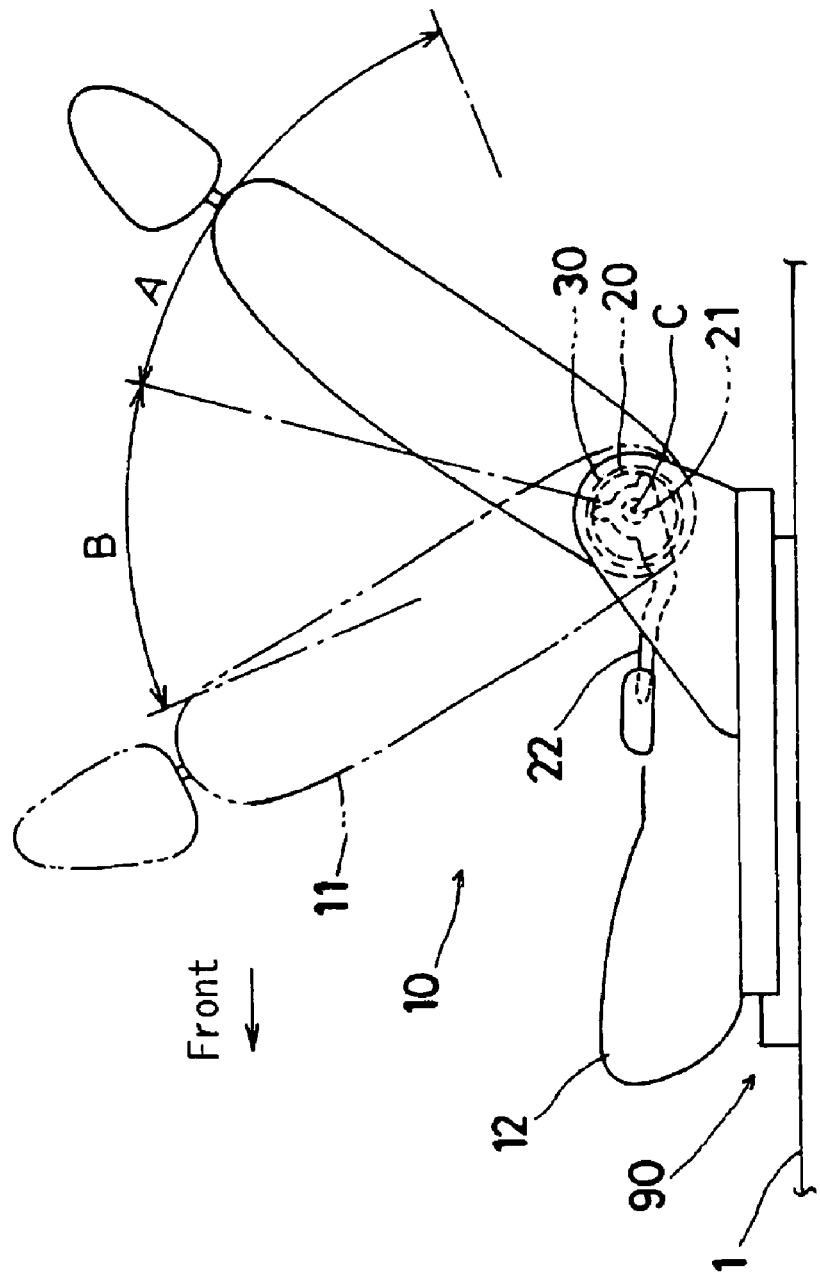
FIG. 8 illustrates a side view of the vehicle seat at which the angle position memorizing device of the vehicle seat device according to the present invention is attached, and FIG. 9 illustrate a cross sectional view of the reclining mechanism of the vehicle seat device according to the present invention.

An embodiment of the present invention will be explained hereinbelow referring to attached drawings. As shown in FIGS. 1, 2 and 8, an angle position memorizing mechanism 20 being a principle component of the present invention is attached at a vehicle seat 10 along with a reclining mechanism 30 for adjusting an angle of a seat back 11 of the seat 10. The seat 10 being used as a driver's seat or a passenger's seat includes a seating range A (within a regular angle range) in which the angle position of the seat back 11 can be adjusted at multistage small angles and a forward reclining range B (outside of a regular angle range) in which the seat back 11 is further reclined from the forward position of the seating range A toward the most forward position without adjusting the angle at each angle stage.

The reclining mechanism 30 includes a known angle position adjusting mechanism not having an after-mentioned function for memorizing the angle position. Specifically, the state of the reclining mechanism 30 is changed from a locked state to an unlocked state by operating the operation lever 22 being in an initial position D shown in FIG. 3 to be raised up to an operating position E shown in FIG. 4. While the reclining mechanism 30 is in the unlocked state, the seat back 11 is reclined to the most forward position in the forward reclining range B so as to make the passenger easy to get on/off the vehicle from a back seat. It is known that a lock mechanism (not shown) of a seat slide device 90 is unlocked to move the seat 10 in forward direction by a spring force so as to make the passenger easy to get on/off the vehicle when the seat back 11 is reclined in forward direction.

According to the vehicle seat having only such reclining mechanism 30, while the reclining mechanism 30 is in the unlocked state, and the seat back 11 is moved in the rear direction to be in the seating range A; the reclining mechanism 30 becomes the locked state at the point where the seat back 11 is restored to the position which is the most forward position of the seating range A. The passenger must therefore readjust the angle of the seat back 11 by operating the reclining mechanism 30.

The angle position memorizing mechanism 20 according to the present invention attached to the seat 10 along with the reclining mechanism 30 restores the seat back 11 to its original position before being reclined in forward direction by pulling the seat back 11 being reclined in the forward position to the rear direction.

Figure 9:
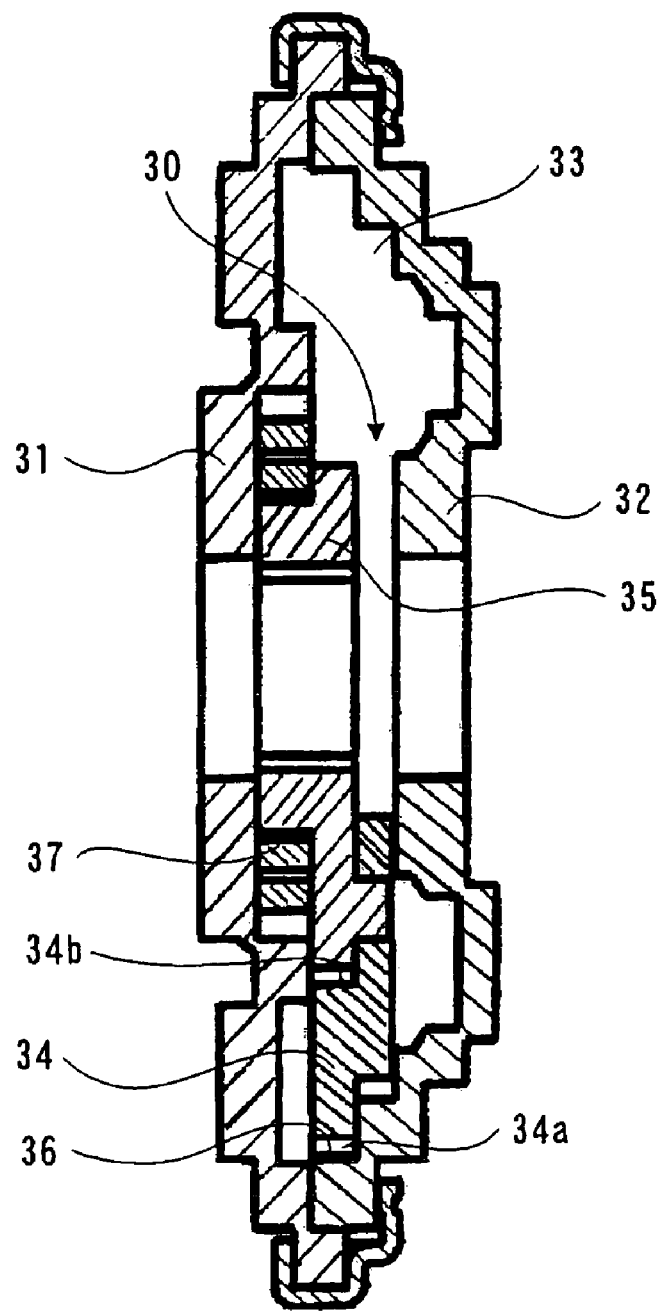

As shown in FIGS. 1 and 2, an upper arm (movable member) 32 being circular form is connected to a seat back frame 16 of the seat back, and a lower arm (fixed member) 31 being circular form is fixed to a cushion frame 17 of the seat cushion 12. As shown in FIG. 9, the upper arm 32 is relative rotatably supported by the lower arm 31, and the reclining mechanism 30 is provided in an inner space 33 surrounded by the upper arm 32 and the lower arm 31. The reclining mechanism 30 includes a shaft 21, a plurality of pawls 34, a cam 35 and inner peripheral gear 36. As shown in FIGS. 1 and 2, the shaft 21 extends along a rotation axis C—C to be penetrated through the lower arm 31 and the upper arm 32. The pawl 34 is supported by the lower arm 31 slidably in radial direction thereof, and an outer peripheral gear 34a is formed at the pawl 34. The cam 35 is fixed to the shaft 21 with a serration 21a (shown in FIG. 2) formed at the outer peripheral surface of the shaft 21 and having a plurality of grooves so as to rotate integrally. The cam 35 is also engaged with an inner surface 34b of the pawl 34 which is provided at the opposite side of the outer peripheral gear 34a. The inner peripheral gear 36 is formed at the upper arm 32 to be engaged with the pawl 34.

In such configuration, the reclining mechanism 30 becomes the locked state when the outer peripheral gear 34a of the pawl 34 is meshed with the inner peripheral gear 36 of the upper arm 32, and the inner surface 34b of the pawl 34 is engaged with the cam 35 so as to limit the relative rotation of the upper arm 32 with the lower arm 31. On the other hand, the reclining mechanism 30 becomes the unlocked state when the cam 35 is disengaged from the inner surface 34b of the pawl 34 by rotating the shaft 21, and the pawl 34 slides in radial direction of the lower arm 31 so that the outer peripheral gear 34a of the pawl 34 is disengaged from the inner peripheral gear 36 of the upper arm 32. As a result, the upper arm 32 rotates relative to the lower arm 31. Further, the reclining mechanism 30 becomes the unlocked state by rotating the shaft 21 with the operation lever 22 being integrally connected to the shaft 21. The reclining mechanism 30 includes a spring 37 applying a biasing forcing to the shaft 21 to be rotated in anticlockwise direction in FIG. 1 so as to maintain the locked state of the reclining mechanism 30. The reclining mechanism 30 becomes the unlocked state by operating the end of the operation lever 22 to be held up against the biasing force applied by the spring 37 so as to rotate the shaft 21 in the clockwise direction in FIG. 1.

As shown in FIG. 2, the angle position memorizing mechanism 20 is provided outside of the seat 10 in seat width direction (left side in FIG. 2) to be rotated about the rotation axis C—C of the reclining mechanism 30. The shaft 21 is penetrated through the angle position memorizing mechanism 20 and the reclining mechanism 30, so that both the angle position memorizing mechanism 20 and the reclining mechanism 30 are operated by a single operation of the operation lever 22. When the reclining mechanisms 30 are provided at both sides of the seat 10, one reclining mechanism 30 is connected with the other reclining mechanism 30 with the shaft 21b. In such case, a single angel position memorizing mechanism 20 can be provided at one side of the seat 10.

As shown in FIG. 1, the angle position memorizing mechanism 20 includes a base bracket 50 (base member) having leg portions 51 and 52 with which the angle position memorizing mechanism 20 is fixed to the cushion frame 17. The base bracket 50 being a plane shape is spaced from the cushion frame 17 and the reclining mechanism 30 respectively at predetermined distances. A hole 54a including a cylindrical flange 54 extending in horizontal direction is provided at approximately the enter portion of the base bracket 50. The shaft 21 is penetrated through the hole 54a so as to rotatably support the bracket 50 relative to the shaft 21.

A memory plate 72 (memory member) being a rectangle shape extending in vertical direction in FIG. 1 includes a hole 72d at a center portion thereof. The memory plate 72 is attached to an outer peripheral surface of the flange 54 through the hole 72d of the memory plate 72. The hole 72d is an oval form, so that the memory plate 72 being engaged with the base bracket 50 forms extremely narrow spaces in width direction of the memory plate 72 between the hole 72d and the outer peripheral surface of the flange 54 and forms relatively large spaces in longitudinal direction of the memory plate 72 between the hole 72d and the outer peripheral surface of the flange 54. Thus, the memory plate 72 is movable in longitudinal direction thereof relative to the flange 54; on the other hand, the movement of the memory plate in width direction thereof is limited.

The memory plate 72 includes an outer gear 72a at the upper edge thereof in FIGS. 1 and 2. The lower edge of the memory plate 72 is bent in the opposite side of the base bracket 50 to form a flange 72b, and a side edge of the memory plate 72 at the center portion thereof is bent in the opposite side of the base bracket 50 to form a flange 72c. A pin 73 extending in horizontal direction is attached to the memory plate at the center position between the outer gear 72a and the hole 72d. The hole 72d includes a flange 72e on the edge thereof, and the flange 72e extends in horizontal direction toward the opposite side of the base bracket 50 in the same ways of the pin 73, the flange 72b and the flange 72c.

A shaft 62 is attached through a hole 53 formed near the outer edge of the base bracket 50. Further, a swing lever 61 is rotatably attached to the shaft 62. A hole 61a is formed at the center portion of the swing lever 61 along the arc form thereof. The swing lever 61 is biased toward the flange 54 side by a spring 63 attached to the swing lever 61 and the shaft 62. The pin 73 of the memory plate 72 is penetrated through the hole 61a being an arc form so as to press the memory plate 72 in lower direction in FIG. 1. A cam surface 61c including a stepped portion 61b is formed at the inner edge surface of the swing lever 61.

A memory spring 64 (elastic member) is attached on the outer peripheral surface of the flange 72e of the memory plate 72. The memory spring 64 includes a coil portion 64a and end portions 64 extending from the coil portion 64a in lower direction in FIG. 1. The memory spring 64 is attached to the memory plate 72 with sandwiching the flange 72b of the memory plate 72 and a cut and raised projecting portion 50a formed at the base bracket 50 on both sides thereof by the end portions 64b at a predetermined force. A width of the cut and raised projecting portion 50a and a width of the flange 72b are the same, so that the memory spring 64 holds the flange 72b at the same position of the cut and raised projecting portion 50a while the force is within a predetermined value to stop the rotation of the memory plate 72 relative to the base bracket 50.

An engaging plate 65 (actuating member) is rotatably attached to the outer peripheral surface of the flange 54 of the base bracket 50 at a hole 65f formed at a center portion of the engaging plate 65. The engaging plate 65 includes a cam portion 65a, an arm portion 65b and a projecting portion 65e. Each portion is extending in radial direction of the engaging plate 65, and a pin 66 is attached at the edge portion of the projecting portion 65e.

A hole 55 is provided at the lower portion of the cut and raised projecting portion 50a of the base bracket 50, through which a shaft 43 is attached. An arm 41 (engaging member) is rotatably supported at the shaft 43 at the lower portion of the arm 41, and a pin 42 (second pin) is attached at the upper portion of the arm 41 through washer 45.

As shown in FIG. 1, a spring 44 and a spring 46 are attached at the shaft 43. One end of the spring 44 is inserted into hole 56, and the other end of the spring 44 is hooked on the arm 41 so as to apply a biasing force to the arm 41 to be rotated in anticlockwise direction in FIG. 1. One end of the spring 46 is inserted into hole 57, and the other end of the spring 46 is hooked on the pin 66 so as to apply a biasing force to the engaging plate 65 to be rotated in clockwise direction in FIG. 1.

The operation lever 22 at which the shaft 21 is fixed is provided at the engaging plate 65 at the opposite side of the base bracket 50 through a washer 67. A pin 22b is fixed at the operation lever 22 to be in parallel with the shaft 21. When the operation lever 22 is rotated in clockwise direction in FIG. 1, specifically, the reclining mechanism 30 is operated to be unlocked, the pin 22b being engaged with the cam surface 61c formed at the lower edge surface of the swing lever 61 is moved over the stepped portion 61b of the cam surface 61c so as to lift up the swing lever 61 in the upper direction in FIG. 1. The memory plate 72 is lifted in upper direction in FIG. 1 due to that the pin 73 fixed to the memory plate 72 is fit into the hole 61a of the swing lever 61.

A latch plate 71 including an inner gear 71a whose center of a pitch circle is on the rotation axis C—C is attached at the side surface of the seat back frame 16. When the memory plate 72 is lifted up by operating the operation lever 22, the outer gear 72a of the memory plate 72 is meshed with the inner gear 71a of the latch plate 71. Thus, the memory plate 71 is integrated with the seat back frame 16 by engaging the outer gear 72a with the inner gear 71a.

Further, an engaging piece 74 is fixed at a side surface of the seat back frame 16. When the seat back 11 is inclined to be in the forward reclining range B shown in FIG. 8, the engaging piece 74 is engaged with an edge portion of the arm potion 65b of the engaging plate 65 so as to rotate the engaging plate 65 in anticlockwise direction in FIG. 1 against the biasing force applied by the spring 46.

The actuation of the angle position memorizing mechanism 20 having the aforementioned configuration will be explained based on FIG. 3 through FIG. 7.

Figure 3:
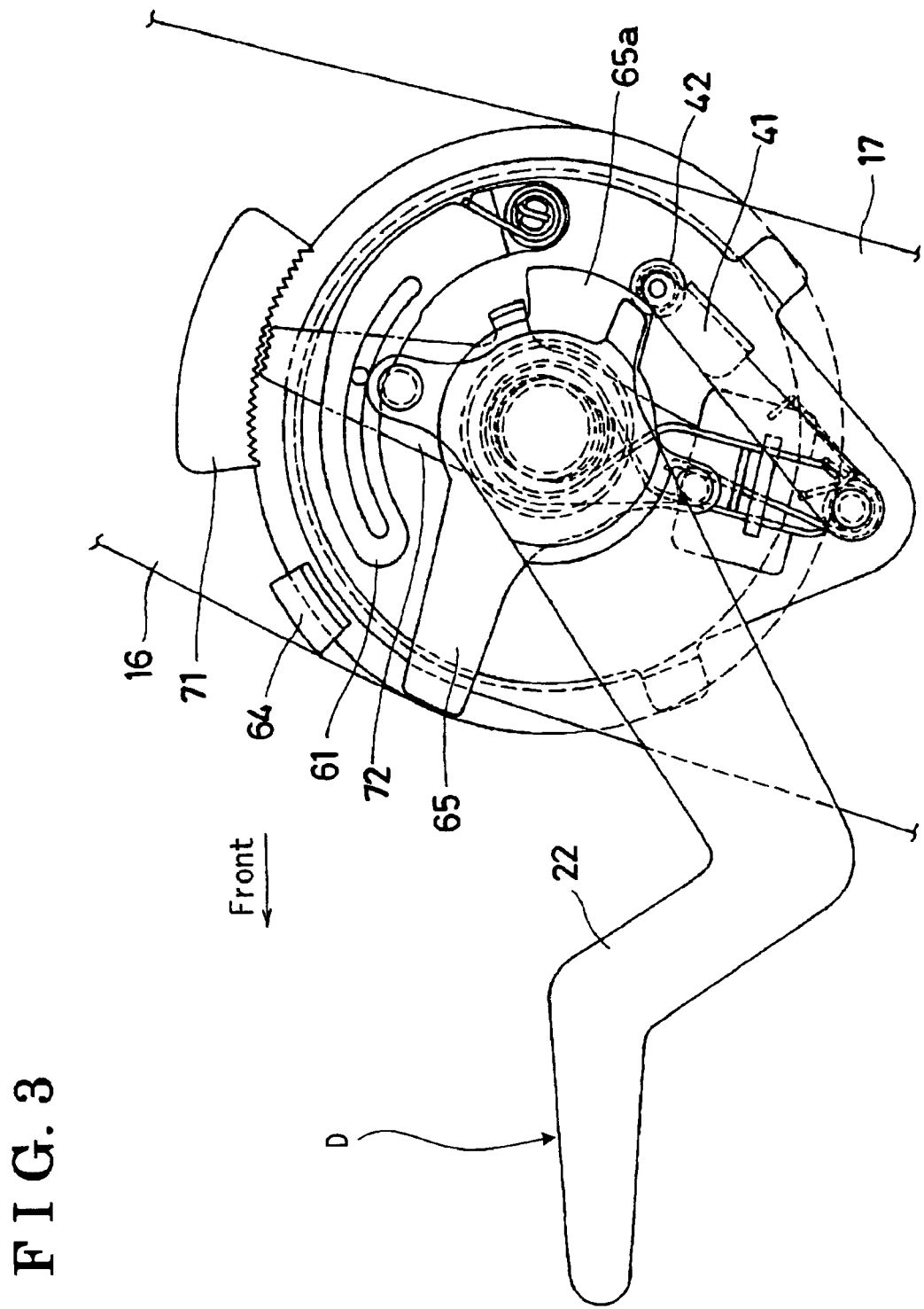
FIG. 3 illustrates a flat view indicating a condition of the angle position memorizing mechanism of the vehicle seat device according to the present invention when the vehicle seat is in a seating state.

FIG. 3 indicates a condition of the angle position memorizing mechanism 20 when the seat back 11 is within the seating range A, the reclining mechanism 30 is in the locked state, and the seat 10 is in a seating position. The pin 42 attached at the upper end portion of the arm 41 is engaged with an outer peripheral surface of the cam portion 65a of the engaging plate 65. The outer gear 72a of the memory plate 72 is disengaged from the inner gear 71a of the latch plate 71.

Figure 4:
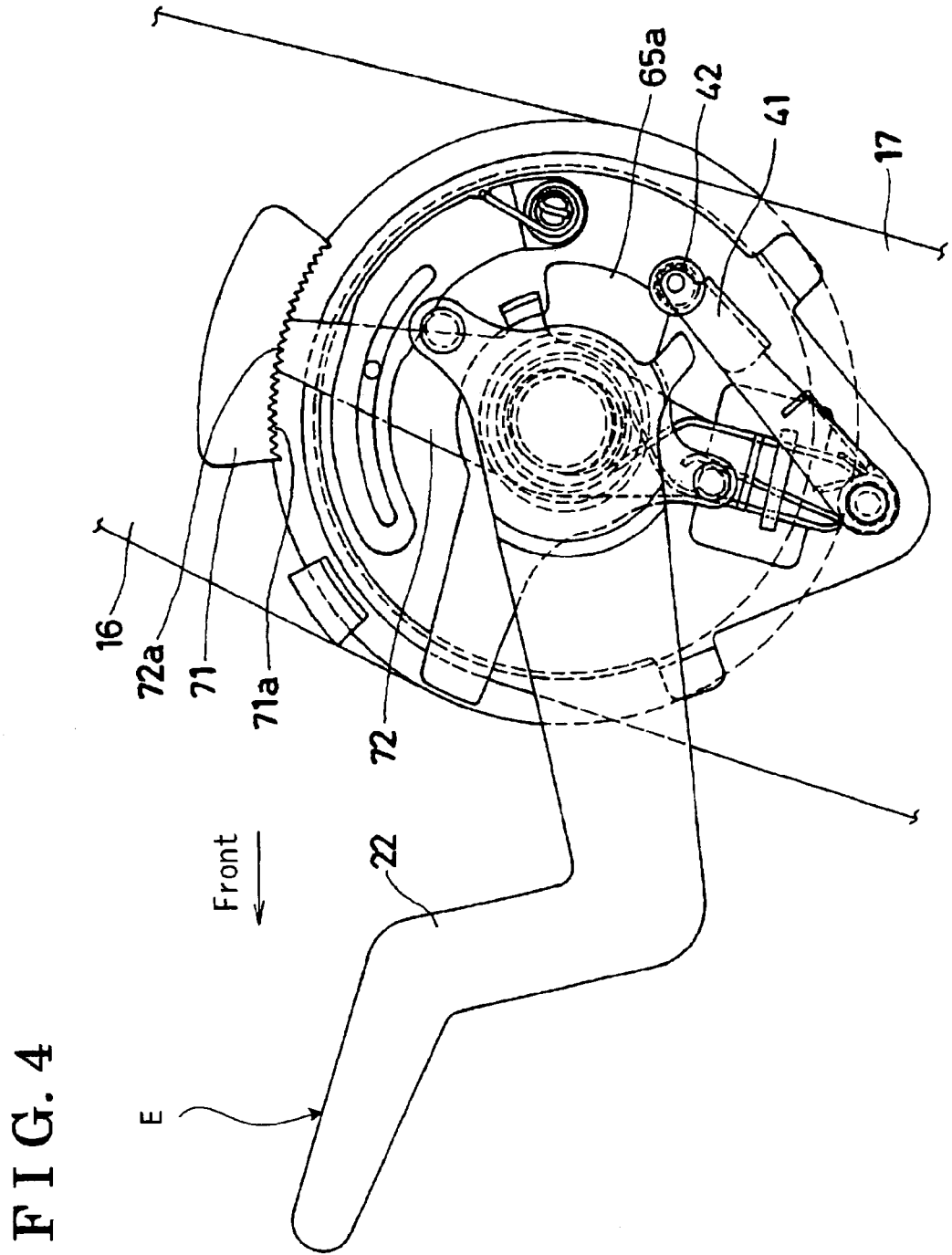
FIG. 4 illustrates a flat view indicating a condition of the angle position memorizing mechanism of the vehicle seat device according to the present invention when the reclining mechanism is in an unlocked state.
Figure 5:
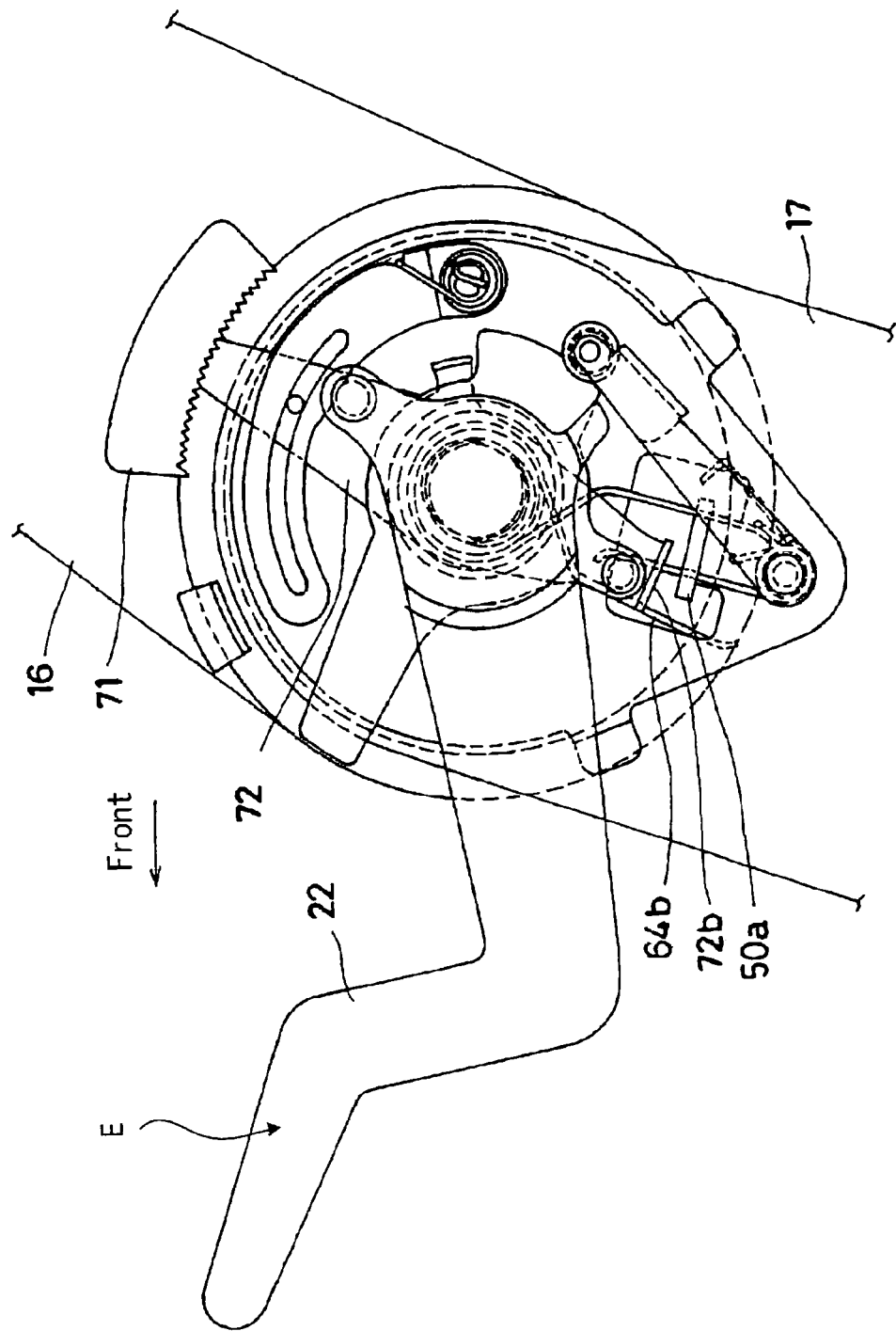
FIG. 5 illustrates a flat view indicating a condition of the angle position memorizing mechanism of the vehicle seat device according to the present invention when an angle of the seat back is adjusted.

As the operation lever 22 being an initial position D shown in FIG. 3 is pulled up to be in the operating position E shown in FIG. 4, the shaft 21 is rotated in the clockwise direction, and the reclining mechanism 30 becomes unlocked state. At the same time, the memory plate 72 is lifted in upper direction in FIG. 4. Thus, the outer gear 72a is engaged with the inner gear 71a so that the memory plate 72 is integrated with the seat back frame 16. In such condition, the angle of the seat back 11 is changed within the seating range A by pulling the seat back 11 backward. FIG. 5 indicates the condition of the angle position memorizing mechanism 20 at this moment. Once the seat back 11 is pulled backward, the flange 72b of the memory plate 72 is engaged with one end portion 64b of the memory spring 64. Thus, the memory plate 72 is rotated in clockwise direction with opening the space between the one end portion 64b and the other end portion 64b which is engaged with the cut and raised projecting portion 50a.

Figure 6:
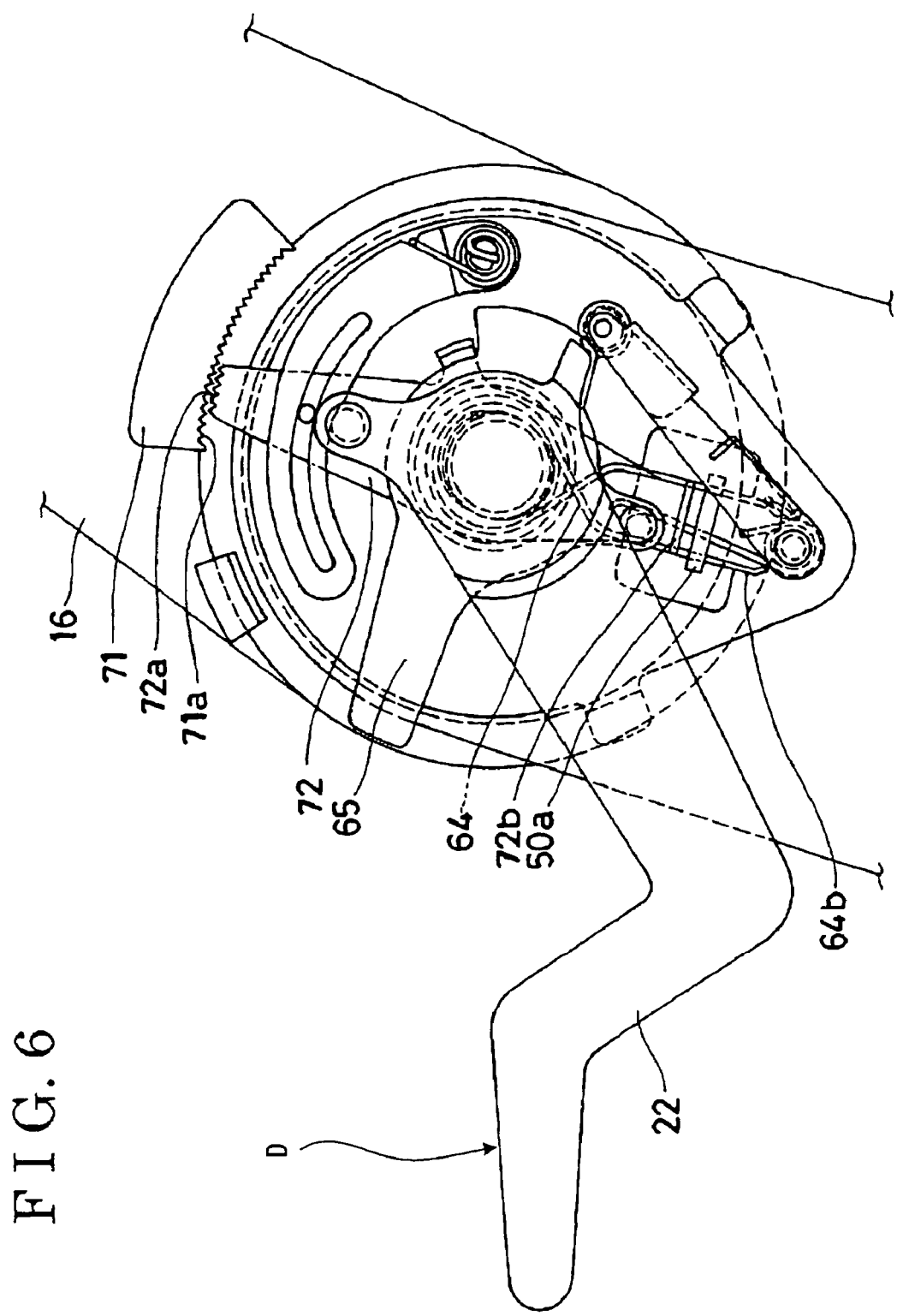
FIG. 6 illustrates a flat view indicating a condition of the angle position memorizing mechanism of the vehicle seat device according to the present invention when the reclining mechanism becomes a locked state again after the angle of the seat back is adjusted.

When the operation lever 22 is released where the angle position of the seat back 11 reaches at the angle which is a passenger's request, and the operation lever 22 is returned from the operating position E to the initial position D, the reclining mechanism 30 becomes the locked state, and the angle thereof is maintained. FIG. 6 indicates the condition of the angle position memorizing mechanism 20 when the reclining mechanism 30 becomes the locked state again. The operation lever 22 is rotated in anticlockwise direction, and the reclining mechanism 30 becomes the locked state. Then, the memory plate 72 is moved in lower direction, and the outer gear 72a is disengaged from the inner gear 71a. At the same time, the memory plate 72 is rotated in anticlockwise direction due to the biasing force applied by the memory spring 64, and the flange 72b is moved back to the same angle position as the cut and raised projecting portion 50a as shown in FIG. 6.

The actuation of the angle position memorizing mechanism 20 when the seat back 11 is reclined in forward direction will be explained based on FIG. 7. Once the reclining mechanism 30 becomes the unlocked state by holding up the operation lever 22 from the initial position D to the operating position E when the seat 10 is not occupied, the seat back 11 is reclined to the most forward angle position within the operation range B due to the force of a forward reclining spring (not shown). At this point, the outer gear 72a of the memory plate 72 is engaged with the inner gear 71a of the latch plate 71 at the angle point before the seat back 11 is reclined forward, so that the memory plate 72 is integrally rotated with the seat back frame 16.

Figure 7:
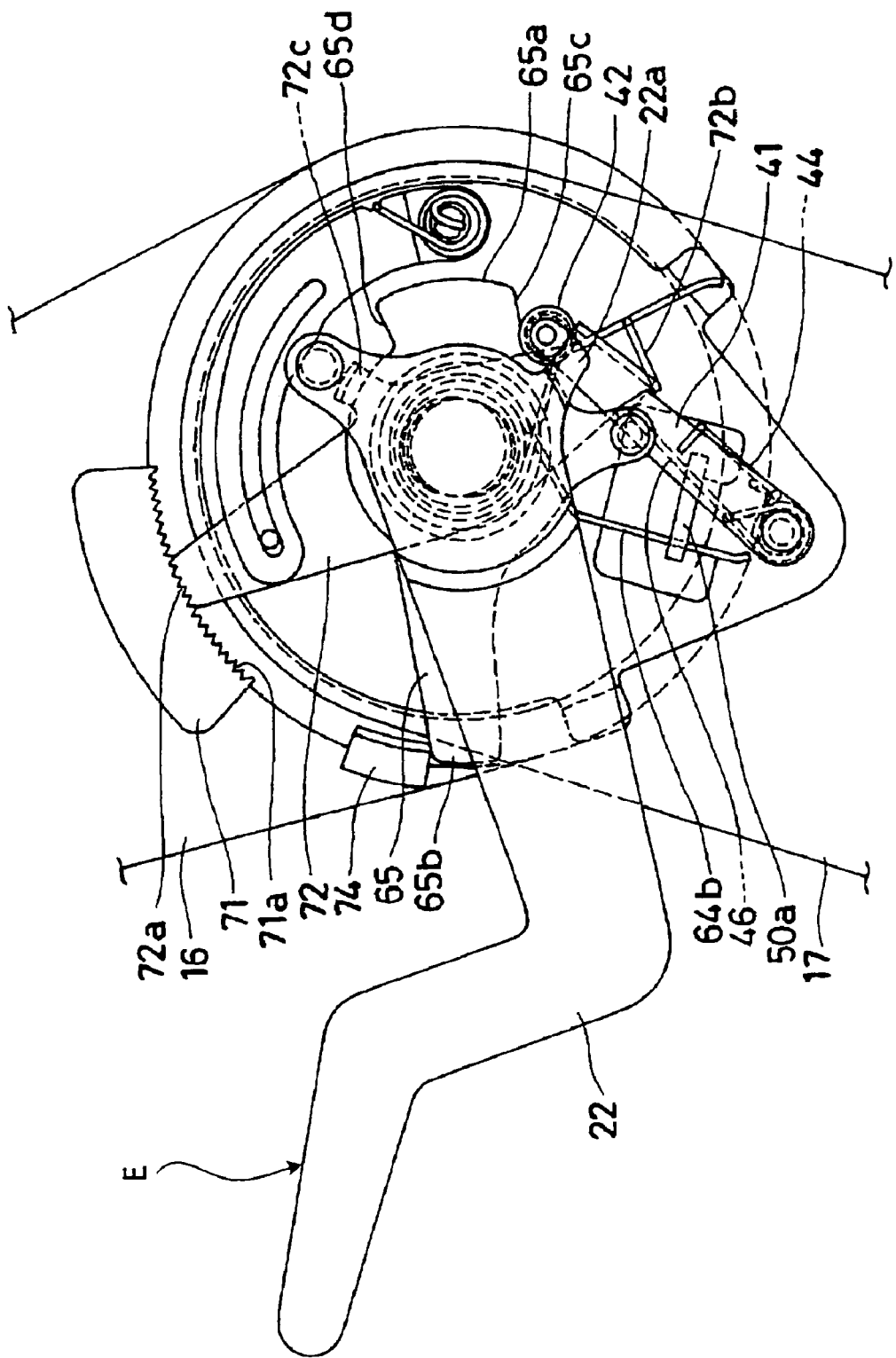
FIG. 7 illustrates a flat view indicating a condition of the angle position memorizing mechanism of the vehicle seat device according to the present invention when the seat back is reclined forward.

As the seat back 11 is reclined forward, the seat back frame 16 is rotated in anticlockwise direction in FIG. 7. Thus, the engaging piece 74 fixed at the seat back frame 16 is engaged with the arm portion 65b of the engaging plat 65. Then, the engaging plate 65 is rotated in anticlockwise direction against the force applied by the spring 46. Due to such rotation, the pin 42 is disengaged from the outer peripheral surface of the cam portion 65a, and then the arm 41 is rotated in anticlockwise direction in FIG. 7 due to the force applied by the spring 44. The pin 42 is sandwiched between a projecting portion 22a formed at the outer peripheral surface of the operation lever 22 and a second side surface 65c of the cam portion 65a as a result. In such condition, operation of the operation lever 22 is returned in the lower direction from the operating position E to the initial position D is prevented so as to hold the reclining mechanism 30 in the unlocked state. At the same time, as shown in FIG. 7, the engagement between the outer gear 72a and the inner gear 71a being in engaged state before the seat back 11 is reclined in forward direction is maintained. At this point, the space between the one end portion 64b and the other end portion 64b being engaged with the cut and raised projecting portion 50a is opened.

The actuation of the angle position memorizing mechanism 20 when the seat back 11 being inclined in forward direction is returned to the angle position within the seating range A, specifically when the seat back 11 being inclined forward is pulled back, will be explained in accordance with FIGS. 7 and 1. The flange 72c provided at the memory plate 72 starts to engage with a first side surface 65d of the engaging plate 65 so as to rotate the engaging plate 65 in the clockwise direction. As the engaging plate 65 is rotated in the clockwise direction, the pin 42 being engaged with the second side surface 65c is lifted on the outer peripheral surface of the cam portion 65a. Thus, the projecting portion 22a of the operation lever 22 is disengaged from the pin 42, and the operation lever 22 is returned from the operating position E to the initial position D where the reclining mechanism 30 becomes the locked state. The position where the flange c is engaged with the first side surface 65d is determined by the position where the memory plate 72 is engaged with the latch plate 71. Further, the angle position where the reclining mechanism 30 becomes the locked state is the position where the seat back 11 is in the seating condition which is before the seat back 11 is reclined in forward direction as shown in FIG. 1.

As described above, the angle position memorizing mechanism 20 according to the present invention shares the reclining mechanism 30 and the shaft 21, however, each component is provided separately. With such configuration, only the reclining mechanism 30 can be attached to a vehicle which is not requiring the angle position memorizing mechanism 20. Thus, a flexibility of a seat design can be widely enhanced by combining such components properly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A seat device for a vehicle comprising:

a reclining mechanism housed in an inner space formed between a fixed member and a movable member, the fixed member being adapted to be mounted on a seat cushion and the movable member being adapted to be mounted on a seat back, the reclining mechanism supporting the movable member rotatably relative to the fixed member and having a locked state in which the movable member is held at an angle position relative to the fixed member by limiting a rotation of the movable member relative to the fixed member within a predetermined regular angle range and an unlocked state in which the movable member is allowed to be rotated relative to the fixed member;

an operation lever connected to the reclining mechanism to be moved from an initial position thereof to an operating position thereof for changing a state of the reclining mechanism from the locked state to the unlocked state;

a base member attached at either one of the fixed member or the movable member;

a latch member attached at the other one of the fixed member or the movable member;

a memory member being engageable with the latch member and rotatably supported by the base member so as to be rotated relative to the base member integrally with the latch member when the memory member is engaged with the latch member;

an actuating member coupled to the movable member so as to be rotated in conjunction with the rotation of the movable member relative to the fixed member at the outside of the regular angle range, an engaging member coupled to the actuating member, held at a disengaged position relative to the operation lever when the movable member is within the regular angle range and moved to an engaging position relative to the operation lever when the movable member is outside of the regular angle range so as to prevent the operation lever from returning from the initial position to the operating position;

the reclining mechanism including:
an inner peripheral gear formed at the movable member,
a pawl slidably supported by the fixed member and including an outer peripheral gear to be engageable relative to the inner peripheral gear, and
a cam connected to the operation lever and being engageable with an inner surface of the pawl provided at the opposite side of the outer peripheral gear so as to mesh the outer peripheral gear of the pawl with the inner peripheral gear;

a swing lever supported by the base member, connected to the operation lever, and connected to the memory member for transmitting the movement of the operation lever from the initial position to the operating position so as to engage the memory member with the latch member; and the operation lever including a shaft at which the cam is fixed and a first pin engaged with the swing lever, the operation lever being moved from the initial position to the operating position so as to rotate the cam for disengaging the outer peripheral gear of the pawl from the inner peripheral gear and rotate the swing lever for engaging the memory member with the latch member.

2. The seat device according to claim 1, wherein the memory member is supported by the base member rotatably relative to the shaft.

3. The seat device according to claim 1, further comprising:
a swing lever supported by the base member, connected to the operation lever and connected to the memory member for transmitting the movement of the operation lever from the initial position to the operating position so as to engage the memory member with the latch member.

4. The seat device according to claim 3, further comprising:
a second pin provided at the engaging member, wherein the actuating member includes:
a cam portion for holding the engaging member at the disengaging position by engaging with the second pin at an outer peripheral surface of the cam portion and for holding the engaging member at the engaging position by engaging with the second pin at a side edge surface of the cam portion.

5. A seat device for a vehicle comprising:
a reclining mechanism housed in an inner space formed between a fixed member and a movable member, the fixed member being adapted to be mounted on a seat cushion and the movable member being adapted to be mounted on a seat back, the reclining mechanism supporting the movable member rotatably relative to the fixed member and having a locked state in which the movable member is held at an angle position relative to the fixed member by limiting a rotation of the movable member relative to the fixed member within a predetermined regular angle range and an unlocked state in which the movable member is allowed to be rotated relative to the fixed member;
an operation lever connected to the reclining mechanism to be moved from an initial position thereof to an operating position thereof for changing a state of the reclining mechanism from the locked state to the unlocked state;

a base member attached at either one of the fixed member or the movable member;
a latch member attached at the other one of the fixed member or the movable member;
a memory member being engageable with the latch member and rotatably supported by the base member so as to be rotated relative to the base member integrally with the latch member when the memory member is engaged with the latch member;
an actuating member coupled to the movable member so as to be rotated in conjunction with the rotation of the movable member relative to the fixed member at the outside of the regular angle range,
an engaging member coupled to the actuating member, held at a disengaged position relative to the operation lever when the movable member is within the regular angle range and moved to an engaging position relative to the operation lever when the movable member is outside of the regular angle range so as to prevent the operation lever from returning from the initial position to the operating position;
a swing lever supported by the base member, connected to the operation lever and connected to the memory member for transmitting the movement of the operation lever from the initial position to the operating position so as to engage the memory member with the latch member; and
a second pin provided at the engaging member, the actuating member including:
a cam portion for holding the engaging member at the disengaging position by engaging with the second pin at an outer peripheral surface of the cam portion and for holding the engaging member at the engaging position by engaging with the second pin at a side edge surface of the cam portion.

6. The seat device according to claim 5, wherein the operation lever includes:
a projecting portion by which the second pin of the engaging member is sandwiched with the side edge surface of the cam portion when the engaging member is positioned at the engaging position so as to prevent the operation lever from moving from the operating position to the initial position.

7. The seat device according to claim 5, wherein the second pin of the engaging member is engaged with the outer peripheral surface of the cam portion while the movable member is in the regular angle range relative to the fixed member.

8. The seat device according to claim 7, further comprising:
an engaging piece provided at the movable member for rotating the actuating member by engaging therewith so as to disengage the second pin of the engaging member from the outer peripheral surface of the actuating member when the movable member is outside of the regular angle range relative to the fixed member.

9. The seat device according to claim 5, further comprising:
a spring provided for constantly applying a force in order that the second pin of the engaging member is engaging with the outer peripheral surface of the actuating member and the engaging member is moved toward the engaging position.

* * * * *